June 6, 1967  J. SCHAEFER  3,324,380
FLUX RESET CIRCUIT
Filed Oct. 28, 1963
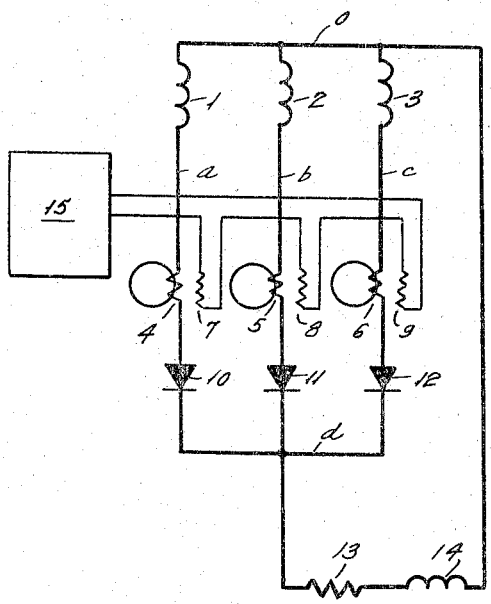
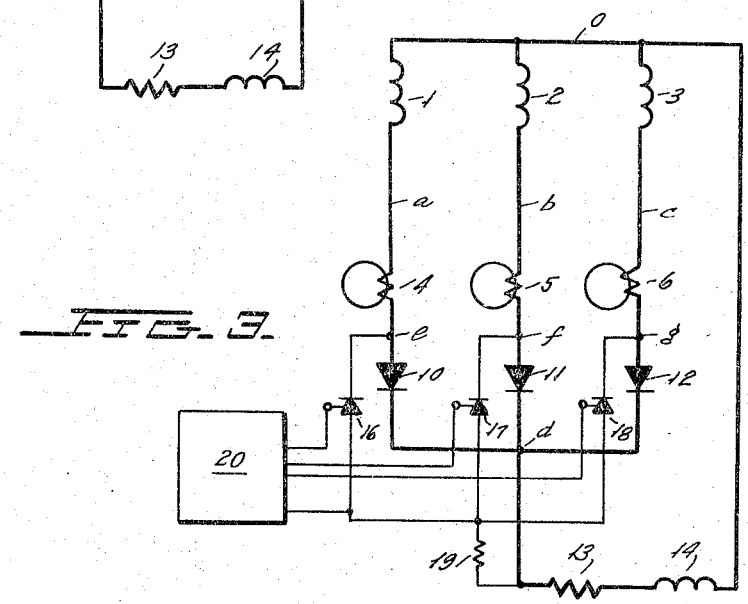
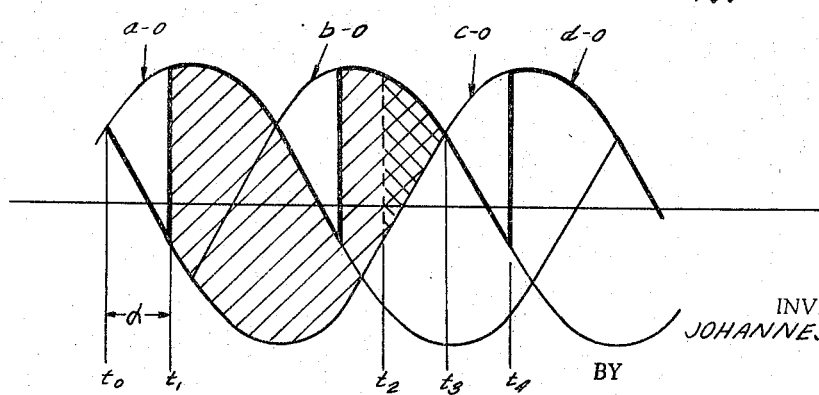
INVENTOR.
JOHANNES SCHAEFER
BY
OSTROLENK, FABER, GERB & SOFFEN
ATTORNEYS United States Patent Office 3,324,380
Patented June 6, 1967

3,324,380
FLUX RESET CIRCUIT
Johannes Schaefer, Philadelphia, Pa., assignor to I-T-E Circuit Breaker Company, Philadelphia, Pa., a corporation of Pennsylvania
Filed Oct. 28, 1963, Ser. No. 319,275
1 Claim. (Cl. 321—25)

My invention relates to a rectifier control system, and more specifically relates to a novel control circuit for saturable reactors connected in series with rectifier elements in a rectifier circuit.

The use of saturable reactors for controlling a rectifier output is well known to those skilled in the art. This type of control generally takes one of two forms. In the first form, the control reactors which are connected in series with respective rectifier elements have a pure D.-C. control current applied thereto. This method has the disadvantage that the degree of phase control for each of the individual phases is a function of the magnetic characteristics of the respective reactor cores. These characteristics may differ from core to core, or between commutating groups of rectifier phases, and these differences are reflected in an unbalance of current between phases.

Another mode of control of saturable reactors is in the "resetting" of the flux of the core prior to the time that the rectifier associated with the core is to conduct a forward current. This type of arrangement guarantees or simplifies equal flux reset in each of the individual phases. However, circuits of this type are complex and expensive.

The present invention provides a novel circuit for resetting the flux prior to conduction of forward current which is simple and inexpensive, and insures equal control for the individual phases of the rectifier. More specifically, and in accordance with the invention, each of the magtic cores have controllable conductive devices such as silicon controlled rectifiers connected to their main or auxiliary control windings. These controllable devices are then fired at some predetermined time prior to the time that forward current conduction is to occur through the associated rectifiers, whereby a voltage is applied to the reactors to reverse the magnetization thereof by some predetermined amount. By providing controlled rectifiers, or similar equivalent devices, for this purpose, it now becomes possible to insure the application of a predetermined number of volt-seconds for reversing the reactor flux with an inherently simple and inexpensive control circuit.

Accordingly, a primary object of this invention is to provide a novel flux reset circuit for the control cores or reactors of a rectifier.

Another object of this invention is to provide controlled rectifier-type devices which are fired at predetermined times prior to the forward conduction of a rectifier associated with a magnetic core whereby the firing permits the application of a predetermined number of volt-seconds to the core for reversing the flux thereof.

Another object of this invention is to provide a simple and inexpensive flux resetting circuit.

A further object of this invention is to provide a novel simple and inexpensive flux reset circuit which permits equal flux reset for each of the cores of a multi-phase rectifier system.

These and other objects of my novel invention will become apparent from the following description when taken in connection with the drawings, in which:

FIGURE 1 schematically illustrates a three-phase half wave rectifier which uses a flux reset system of the type well known to the art.

FIGURE 2 shows a diagram of the voltages of each of the phases of FIGURE 1 to illustrate the operation thereof.

FIGURE 3 illustrates a circuit similar to that of FIGURE 1 adapted with the novel flux reset circuit of the invention.

Referring now to FIGURE 1, I have illustrated therein a conventional three-phase half wave rectifier which includes a main multiphase A.-C. power transformer having secondary windings 1, 2 and 3. Each of the phases 1, 2 and 3 are then provided with control reactors 4, 5 and 6 respectively which are of the saturable type, as is well known to those skilled in the art, and which have main or "gate" windings connected in series with rectifiers 10, 11 and 12. It is to be noted that rectifiers 10, 11 and 12 may be of any desired type such as semiconductor-type rectifiers, and may, for example, represent large numbers of series-parallel connected arrays for achieving some predetermined independent rating.

Each of control reactors 4, 5 and 6 are additionally provided with auxiliary windings 7, 8 and 9 respectively where these windings are wound on the same core as the main or gate windings of the reactor.

The neutral point of windings 1, 2 and 3 which form a wye-connected secondary winding of the power transformer is then connected to one terminal of a load represented by resistance 13 and inductance 14. The other load terminal is connected to the positive output junction of rectifiers 10, 11 and 12.

Each of auxiliary windings 7, 8 and 9 are then driven from suitable control circuits schematically represented by block 15.

The operation of the circuit of FIGURE 1 is schematically illustrated in FIGURE 2. The three-phase voltages of FIGURE 2 are labeled $a$–0, $b$–0 and $c$–0 which represents the voltages between the points $a$, $b$ and $c$ to the transformer neutral point 0 in FIGURE 1. The output voltage of the system is the voltage shown in heavy lines in FIGURE 2, and which is labeled $d$–0.

The cross-hatched area shown in FIGURE 2 represents the voltage difference between points $c$ and $d$ in FIGURE 1. This voltage is in part absorbed by diode 12 in the reverse direction, and is also in part absorbed during the beginning of forward conduction conditions for diode 12 by the reactor 6. Thus, the number of voltseconds which are absorbed by the reactor 6 prior to forward conduction conditions will necessarily balance the number of voltseconds withheld from the output before reactor 6 saturates so that phase $c$ can carry full load current.

It will be noted that where a straight D-C control current is used in windings 7, 8 and 9, the number of voltseconds controlled will be a function not only of the control current, but also of the characteristics of the individual reactor cores which may not be identical in the individual phases. Therefore, to obtain equal voltage reduction in the individual phase, particularly where commutating groups are connected in parallel through an interphase transformer, an arrangement is highly desirable where the number of voltseconds absorbed by the control reactors 4, 5 and 6 can be directly controlled.

This type arrangement is shown in FIGURE 3 where components similar to those of FIGURE 1 have been given similar identifying numerals. In FIGURE 3, however, the control windings 7, 8 and 9 of FIGURE 1 have been eliminated and controlled rectifiers 16, 17 and 18 are connected at points $e$, $f$ and $g$ respectively. The bottom of each of controlled rectifiers 16, 17 and 18 are then connected together, and are then connected in series with current limiting resistor 19 to terminate on the positive output terminal of rectifiers 10, 11 and 12. It will be noted that controlled rectifiers 16, 17 and 18 are connected in a direction to permit the introduction of reverse current through the gate windings of reactors 4, 5 and 6.

In operation, and referring to FIGURE 2, if controlled rectifier 18 is fired at time $t_2$, the voltage time integral marked by the double cross-hatched area in FIGURE 2 will be forced to be absorbed by reactor 6. This causes some predetermined flux change in the reactor core, whereby an opposite change must occur between times $t_3$ and $t_4$ (corresponding to the delay angle $\alpha$ between times $t_0$ and $t_1$) before the core of reactor 6 is saturated so that full load current can pass through rectifier 12. Hence, the voltage time integral or number of voltseconds which are withheld from the load between times $t_3$ and $t_4$ is equal to the voltage time integral absorbed between $t_2$ and $t_3$. This value is a function of the firing instant $t_2$ of rectifier 18 because the voltage is strictly defined by potentials at points $b$ and $c$. Note that the current flowing through diode 18 between times $t_2$ and $t_3$ is dictated by the magnetizing current of reactor 6 which is very small in comparison to the full load current. Thus, controlled rectifier 18 is a relatively small element.

It will be apparent that each of controlled rectifiers 16 and 17 operate in a manner identical to that described for rectifier 18. Clearly, a simple control circuit 20 may be provided for firing the controlled rectifiers 16, 17 and 18 at suitable times within the cycle. Moreover, circuitry 20 can include suitable sensing components to set the instant of firing as a function of difference between the output voltage of the rectifier (or the rectifier load current) and the desired value.

While the embodiment of FIGURE 3 derives reset power from the main rectifier circuit, it will be apparent that an auxiliary source of reset power can be provided. That is to say, after controlled rectifier 18 has fired, the voltage used in resetting source 6 is the voltage shown in FIGURE 2 in the double cross-hatched lines. However, a completely isolated control circuit could be provided with its own source of resetting power.

Although I have described my novel invention with respect to its preferred embodiments, it should be understood that many variations and modifications will now be obvious to those skilled in the art, and I prefer therefore to be limited not by the specific disclosure herein but only by the appended claim.

The embodiments of the invention in which an exclusive privilege or property is claimed are defined as follows:

I claim:
A control circuit for a power conversion system; said power conversion system including the series connection of a rectifier element, a saturable core reactor, and A-C system, and a D-C system; said control circuit comprising a controllably conductive device and conduction initiating means connected to said controllably conductive device for initiating conduction of said controllably conductive device at some adjustably predetermined time prior to forward conduction conditions for said rectifier element; a source of resetting voltage comprising the sole source of control for said power conversion system; said controllably conductive device being connected in series with said source of resetting voltage and said saturable core reactor, said controllably conductive device having a polarity to permit current flow through said saturable core reactor in a direction opposite to the direction of forward current flow through said rectifier element, whereby said source of resetting voltage resets the flux of said saturable reactor from the time that conduction of said controllably conductive device is initiated until forward conduction conditions are achieved for said rectifier element; said controllably conductive device comprising a controlled rectifier; said source of resetting voltage including said A-C system; a current limiting resistor connected in series with said controlled rectifier; said power conversion system comprising a multiphase system; each of said phases of said multiphase system being formed of one of said saturable core reactor, one of said rectifier elements, and one of said control circuits for said saturable core reactor.

References Cited

UNITED STATES PATENTS

| | | | |
|---|---|---|---|
| 2,807,768 | 9/1957 | Sherlock et al. | 323—89 |
| 2,857,563 | 10/1958 | Syrbe | 321—25 |
| 2,895,101 | 7/1959 | Blatter | 321—25 |

FOREIGN PATENTS

| | | |
|---|---|---|
| 1,088,550 | 9/1960 | Germany. |

JOHN F. COUCH, *Primary Examiner.*

M. L. WACHTELL, *Assistant Examiner.*